(12) United States Patent
Shamoto

(10) Patent No.: US 10,498,209 B2
(45) Date of Patent: Dec. 3, 2019

(54) FLYWHEEL, MANUFACTURING METHOD THEREOF, AND POWER GENERATING APPARATUS

(71) Applicants: FLYCONVER CO., LTD, Kanagawa-ken (JP); Hiroyuki Shamoto, Kanagawa-ken (JP)

(72) Inventor: Hiroyuki Shamoto, Kanagawa-ken (JP)

(73) Assignees: Flyconver Co., Ltd., Kanagawa-Ken (JP); Hiroyuki Shamoto, Kanagawa-Ken (JP)

( * ) Notice: Subject to any disclaimer, the term of this patent is extended or adjusted under 35 U.S.C. 154(b) by 602 days.

(21) Appl. No.: 15/180,792

(22) Filed: Jun. 13, 2016

(65) Prior Publication Data

US 2017/0170713 A1    Jun. 15, 2017

(30) Foreign Application Priority Data

Dec. 11, 2015  (JP) ................................ 2015-242373

(51) Int. Cl.
| | |
|---|---|
| *H02K 47/20* | (2006.01) |
| *H02K 7/02* | (2006.01) |
| *H02K 7/09* | (2006.01) |
| *H02K 15/03* | (2006.01) |

(Continued)

(52) U.S. Cl.
CPC ............ *H02K 47/20* (2013.01); *H02K 7/025* (2013.01); *H02K 7/09* (2013.01); *H02K 7/1004* (2013.01);

(Continued)

(58) Field of Classification Search
CPC ............ H02K 47/20; H02K 7/02; H02K 7/10; H02K 7/025; H02K 7/09; H02K 15/03;

(Continued)

(56) References Cited

U.S. PATENT DOCUMENTS

| 6,710,489 B1 | 3/2004 | Gabrys | |
|---|---|---|---|
| 2006/0096796 A1* | 5/2006 | Leijon | B60K 6/105 180/65.22 |

(Continued)

FOREIGN PATENT DOCUMENTS

| CN | 201956795 U | 8/2011 |
|---|---|---|
| EP | 1 612 913 A2 | 1/2006 |

(Continued)

OTHER PUBLICATIONS

Extended European Search Report for Application No. 16174101.2, dated Apr. 25, 2017 (7 pages).

(Continued)

*Primary Examiner* — Naishadh N Desai
(74) *Attorney, Agent, or Firm* — Nutter McClennen & Fish LLP

(57) ABSTRACT

In accordance with an embodiment, a flywheel includes a rotary shaft which is rotatably provided to the flywheel, a rotor which is fixed to the rotary shaft and rotatable with the rotary shaft, and an unrotatable stator arranged so as to face the rotor. The rotor includes first permanent magnets provided on a first surface facing the stator. The stator includes second permanent magnets which are provided on a second surface facing the rotor in correspondence with the first permanent magnets respectively and have the same polarity as that of the first permanent magnets.

13 Claims, 9 Drawing Sheets

(51) Int. Cl.
*H02K 7/10* (2006.01)
*H02P 8/00* (2006.01)
*H02K 53/00* (2006.01)

(52) U.S. Cl.
CPC .............. *H02K 15/03* (2013.01); *H02P 8/00* (2013.01); *H02K 53/00* (2013.01); *H02K 2213/09* (2013.01); *Y02E 60/16* (2013.01); *Y10S 74/09* (2013.01)

(58) Field of Classification Search
CPC .. H02K 7/1004; H02K 2213/09; H02K 53/00; H02P 8/00; Y02E 60/16; Y10S 74/09
USPC .......................................... 310/74, 152, 153
See application file for complete search history.

(56) References Cited

U.S. PATENT DOCUMENTS

| | | | |
|---|---|---|---|
| 2009/0072639 A1* | 3/2009 | Seneff | H02K 1/2793 310/43 |
| 2012/0049663 A1 | 3/2012 | Mishra et al. | |
| 2015/0162799 A1* | 6/2015 | Ilan | H02K 7/025 310/74 |

FOREIGN PATENT DOCUMENTS

| | | | | |
|---|---|---|---|---|
| GB | 2491675 | A | * 12/2012 | ............ F16F 15/315 |
| GB | 2491675 | A | 12/2012 | |
| JP | 01-206865 | A | 8/1989 | |
| JP | 09-021421 | A | 1/1997 | |
| JP | 2006-025468 | A | 1/2006 | |
| JP | 4524110 | B2 | 8/2010 | |
| JP | 2010-216271 | A | 9/2010 | |
| JP | 2012-041909 | A | 3/2012 | |
| JP | 4926263 | B2 | 5/2012 | |
| JP | 2014-212622 | A | 11/2014 | |
| JP | 2015-079671 | A | 4/2015 | |
| JP | 5740760 | B1 | 7/2015 | |
| WO | 2014/020593 | A1 | 2/2014 | |

OTHER PUBLICATIONS

Chinese Office Action dated Mar. 13, 2019, in Appln. No. 201610410864.X (18 pages).

* cited by examiner

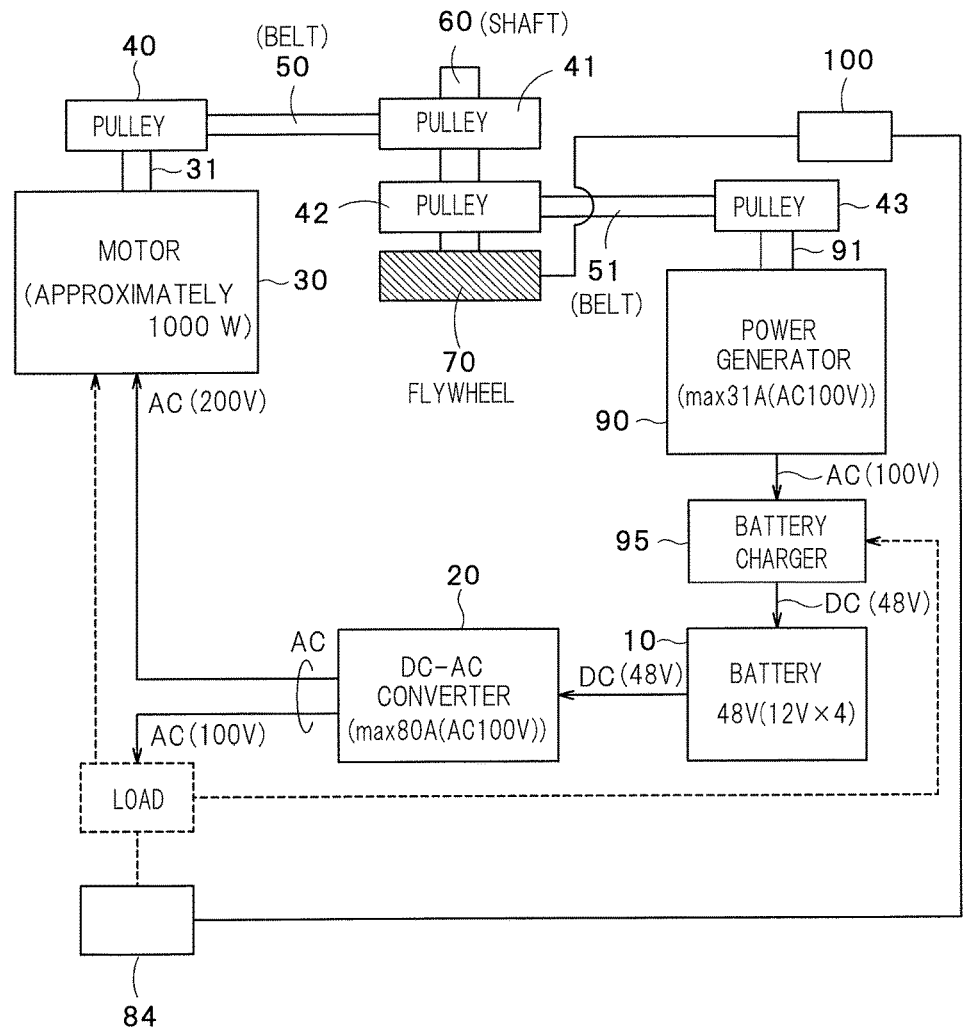
F I G. 1

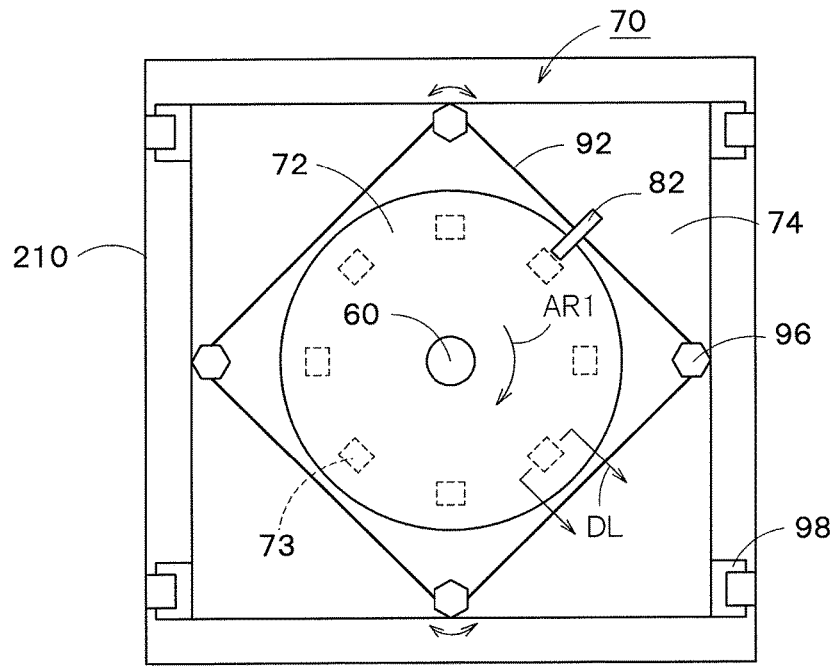
F I G. 2
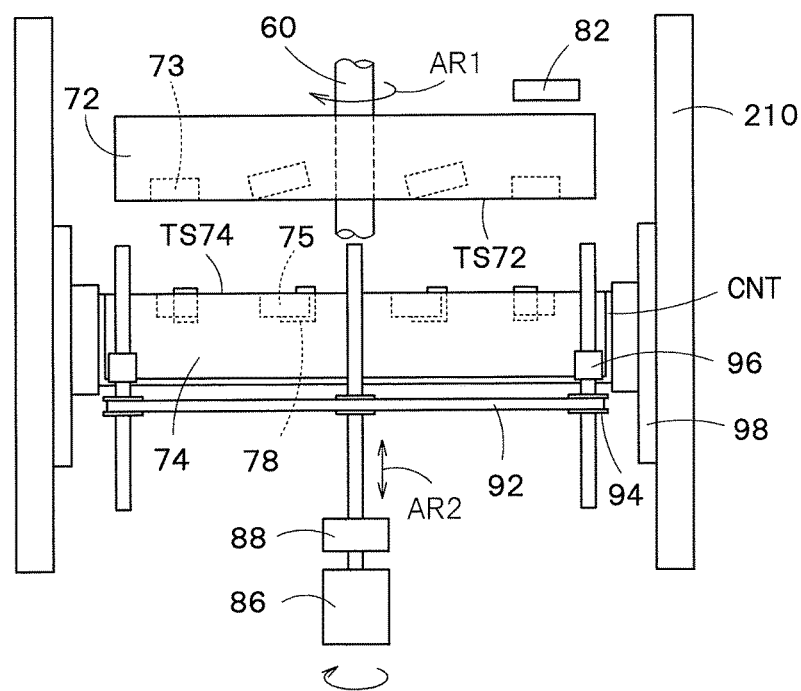
F I G. 3

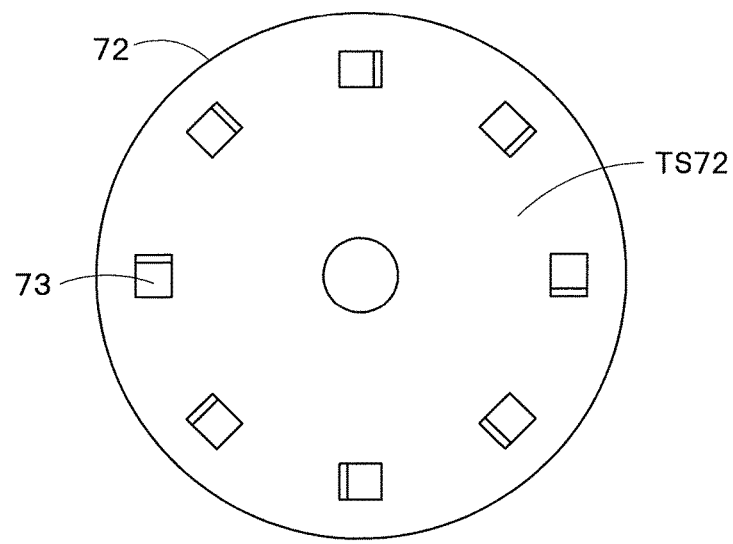
F I G. 4
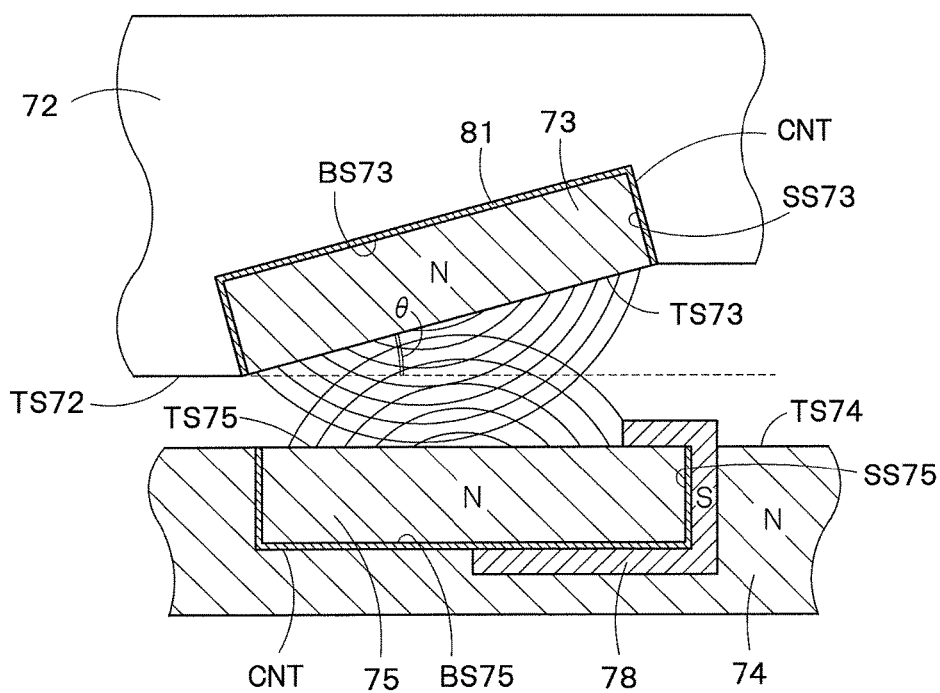
F I G. 5

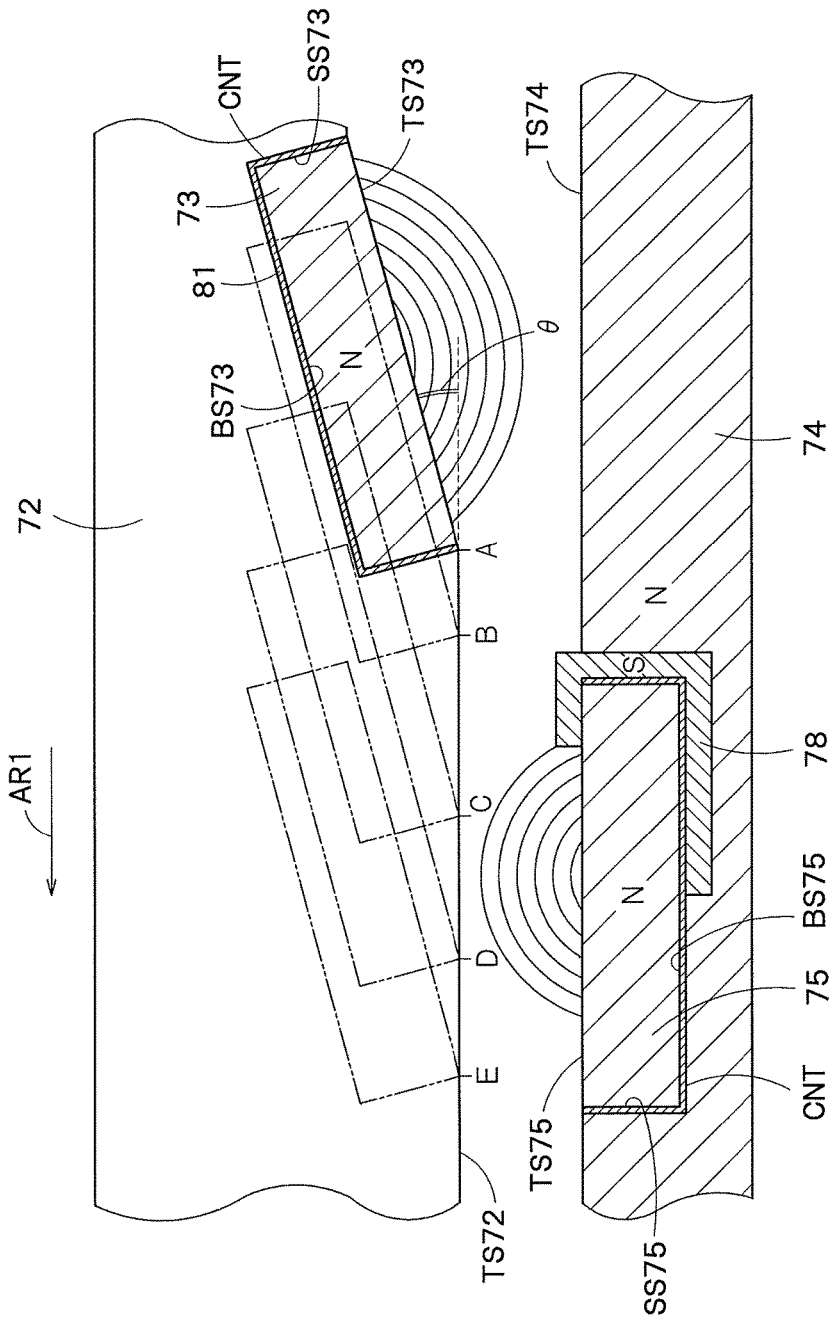
F I G. 6

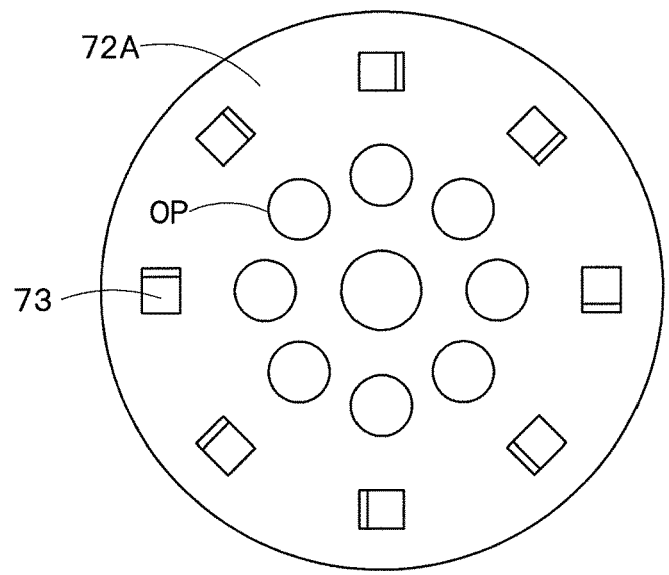
F I G. 7
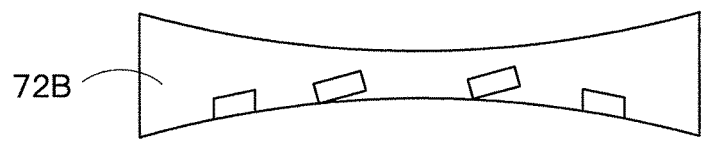
F I G. 8
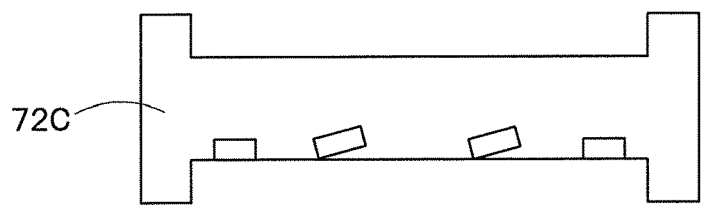
F I G. 9

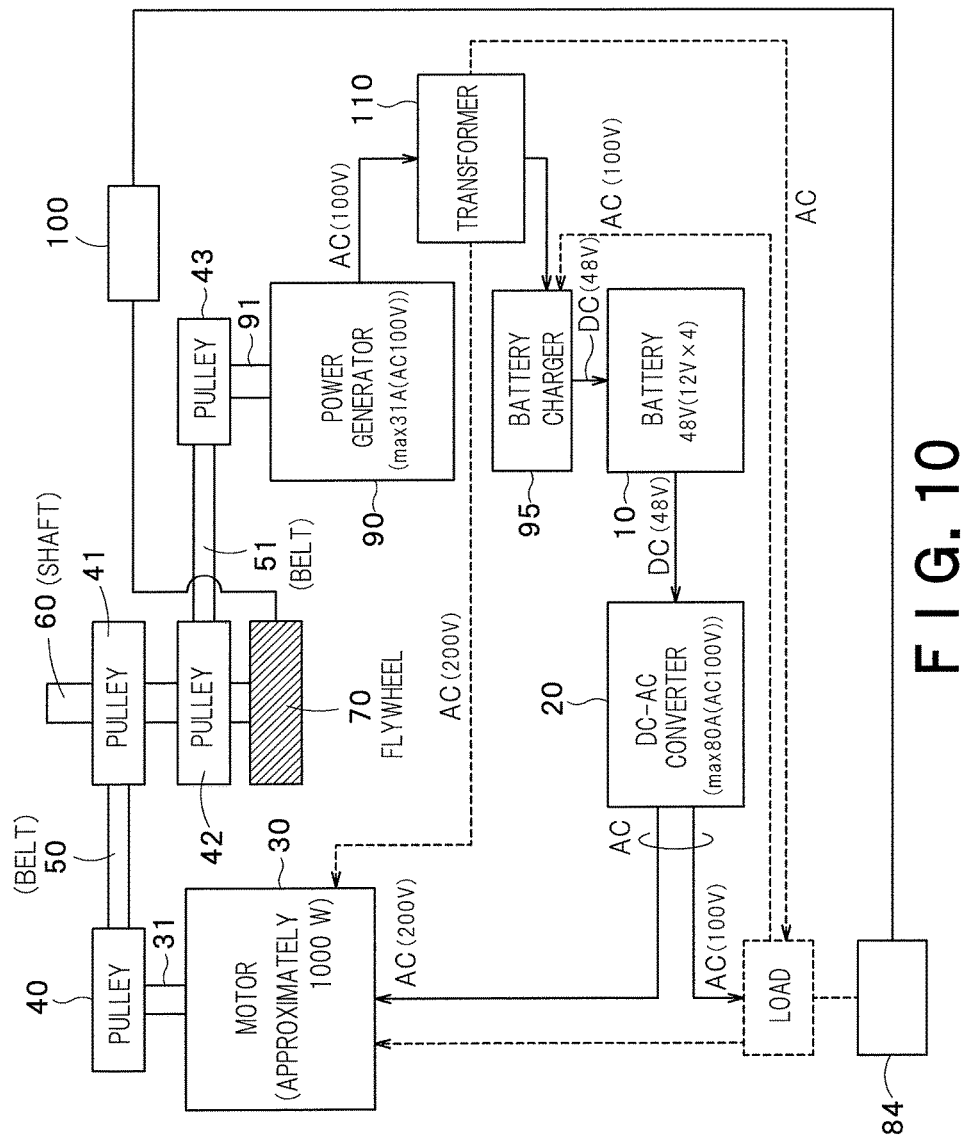
F I G. 10

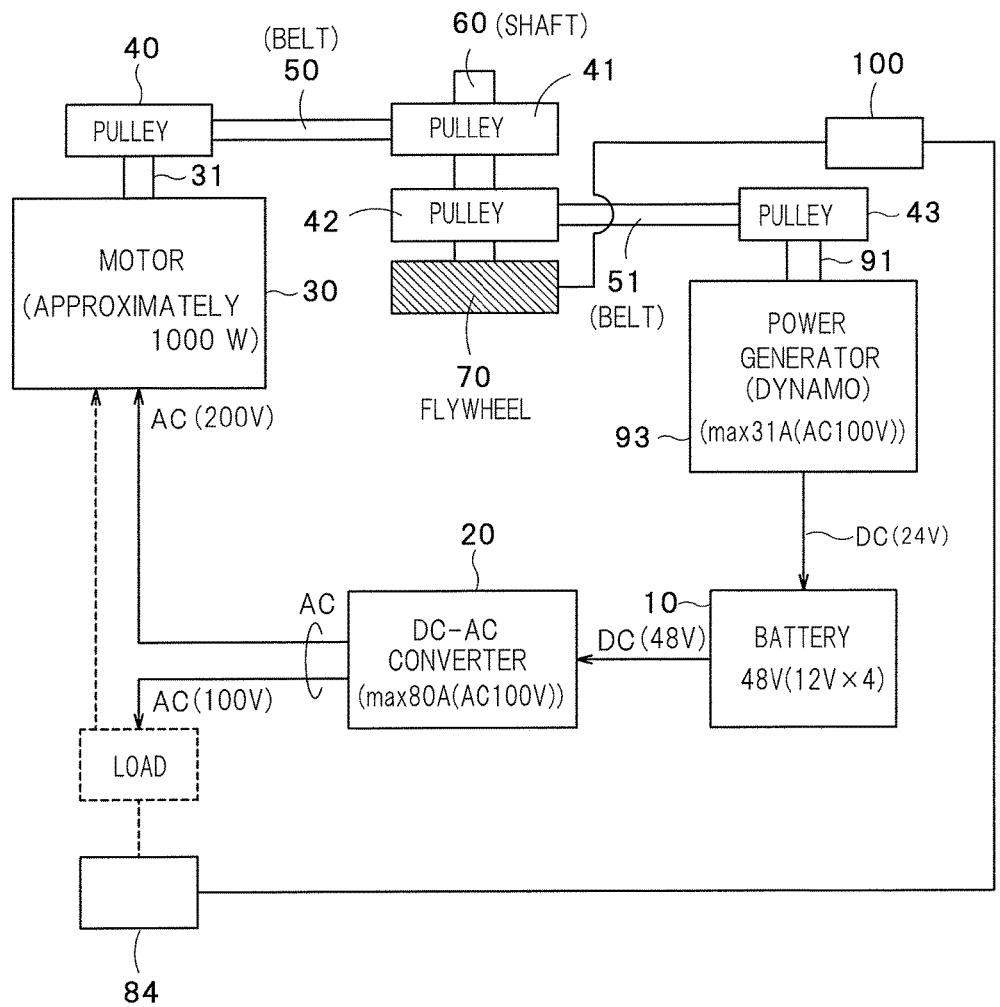
F I G. 11

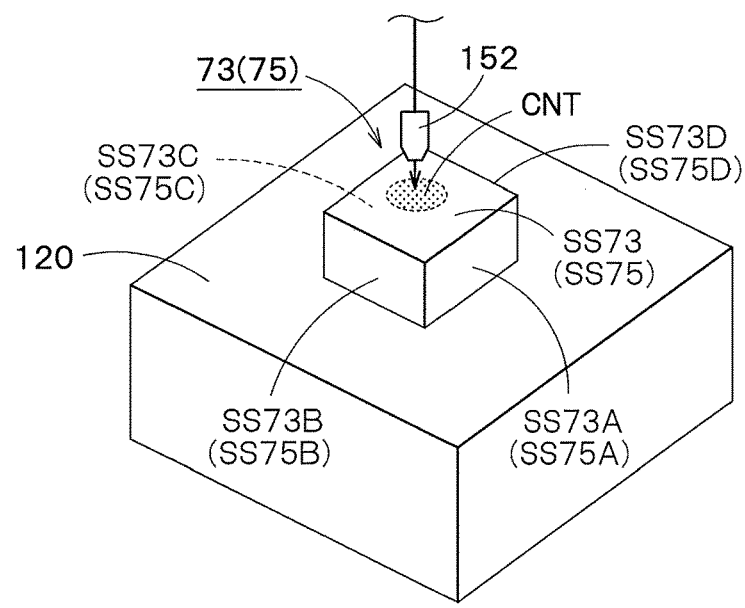
F I G. 12
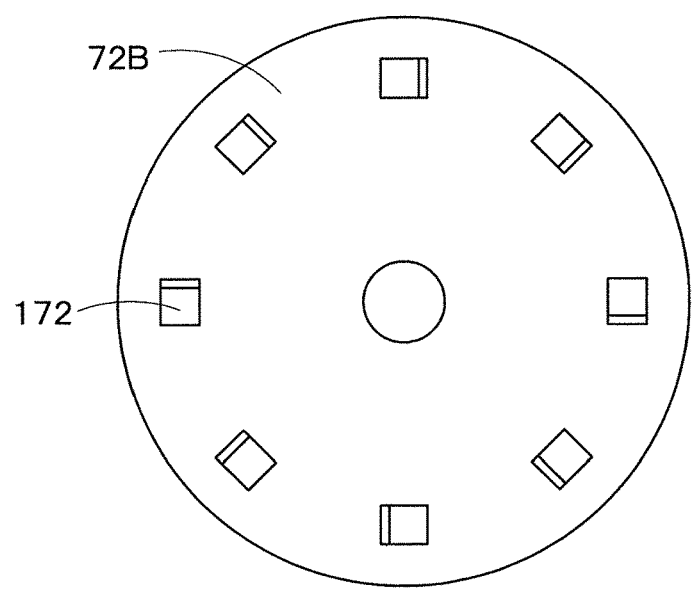
F I G. 13

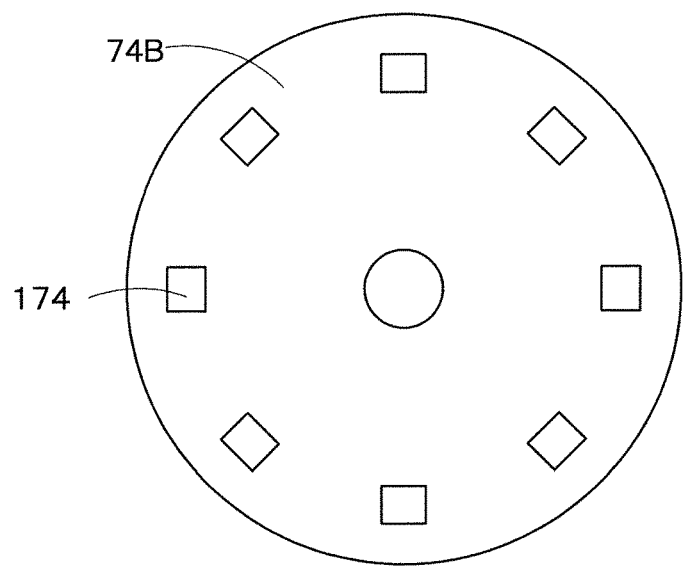
F I G. 14
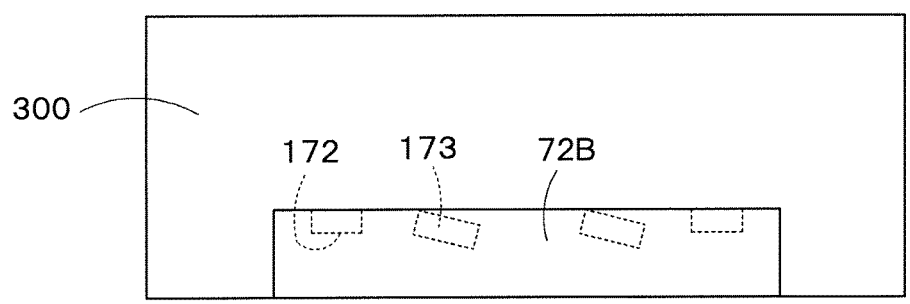
F I G. 15
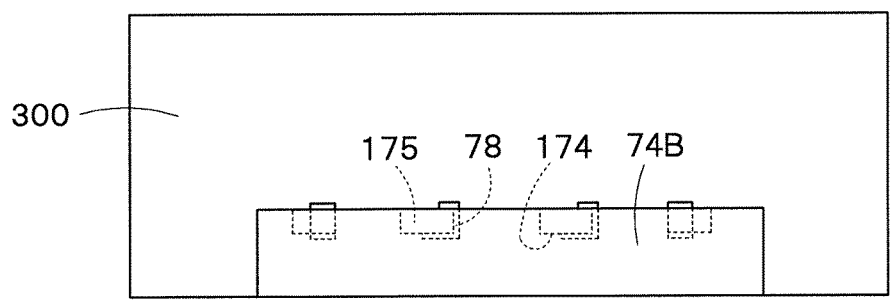
F I G. 16

FLYWHEEL, MANUFACTURING METHOD THEREOF, AND POWER GENERATING APPARATUS

CROSS-REFERENCE TO RELATED APPLICATIONS

This application is based upon and claims the benefit of priority from the prior Japanese Patent Application No. 2015-242373, filed on Dec. 11, 2015, the entire contents of which are incorporated herein by reference.

BACKGROUND OF THE INVENTION

Field of the Invention

The present invention relates generally to a flywheel, a manufacturing method thereof, and a power generating apparatus.

Background Art

A flywheel is configured to store large kinetic energy by rotating a rotor like a spinning top having a predetermined inertia mass at high speed. In a power generating apparatus using such a flywheel, the flywheel stores superfluous (or regenerated) electrical energy as kinetic energy of the rotor, and a power generator converts this kinetic energy of the flywheel into electrical power energy and charges a storage battery. The electrical power energy stored in the storage battery can be reused as power consumed by a load.

In a conventional flywheel, a permanent magnet is used on a rotor side, but an electromagnet is used on a stator side, and hence means for supplying an alternating current to this electromagnet must be disposed to a rotary shaft or the like of the flywheel. Consequently, a configuration of an apparatus is complicated, which obstructs miniaturization and generalization of the flywheel.

Thus, there is a demand for the flywheel which can store the large kinetic energy with a simple configuration.

SUMMARY OF THE INVENTION

In accordance with an embodiment of the present invention, there is provided a flywheel including a rotary shaft which is rotatably provided to the flywheel, a rotor which is fixed to the rotary shaft and rotatable with the rotary shaft, and an unrotatable stator arranged so as to face the rotor. The rotor includes first permanent magnets provided on a first surface facing the stator. The stator includes second permanent magnets which are provided on a second surface facing the rotor in correspondence with the first permanent magnets respectively and have the same polarity as that of the first permanent magnets.

In accordance with another embodiment of the present invention, there is provided a power generating apparatus including a rechargeable battery, a flywheel, a motor and a power generator. The rechargeable battery is configured to supply electrical power. The flywheel includes a rotatable rotary shaft, a rotor rotatably fixed to the rotary shaft and an unrotatable stator arranged so as to face the rotor. The motor is configured to receive the electrical power from the battery and rotates the rotary shaft. The power generator is configured to convert kinetic energy of the rotor into electrical energy and charges the battery. The rotor includes first permanent magnets arranged on a first surface facing the stator. The stator includes second permanent magnets which are arranged on a second surface facing the rotor in correspondence with the first permanent magnets respectively and have the same polarity as that of the first permanent magnets.

In accordance with a further embodiment of the present invention, there is provided a manufacturing method of a flywheel including processes of: preparing a rotor plate with first concaves arranged on a first surface in rotation symmetry, arranging first magnetizable metal chips in the first concave portions on the rotor plate, respectively, magnetizing the first magnetizable metal chips after the arrangement on the rotor plate to form first permanent magnets, preparing a stator plate with second concaves arranged on a second surface in rotation symmetry in correspondence with the first concaves, arranging the second magnetizable metal chips in the second concaves on the stator plate, respectively, magnetizing the second magnetizable metal chips after the arrangement on the stator plate to form second permanent magnets, disposing the stator plate inside a housing, and fixing the rotor plate to a rotatory shaft so as to be rotatable with the rotary shaft, positioning the stator plate in such a manner that the first surface faces the second surface, and then rotatably disposing the rotor plate onto the stator plate in the housing.

BRIEF DESCRIPTION OF THE DRAWINGS

In the accompanying drawings:

FIG. 1 is an example of a block diagram showing an example of a configuration of a power generating apparatus according to a first embodiment of the present invention;

FIG. 2 is an example of a plan view showing a structural example of a flywheel according to the first embodiment;

FIG. 3 is an example of a front view showing the structural example of the flywheel according to the first embodiment;

FIG. 4 is an example of a rear view of a rotor shown in FIG. 2 and FIG. 3;

FIG. 5 is an example of a view showing an example of a partial cross-sectional view of the rotor and a stator taken along a cutting line in FIG. 2;

FIG. 6 is an example of a view to explain functions of attractive force and repulsive force provided by magnetic lines of force between permanent magnets of the rotor and the stator in the flywheel according to the first embodiment;

FIG. 7 is an example of a plan view showing a modification of the rotor depicted in FIG. 2 and FIG. 3;

FIG. 8 is an example of a front view showing another modification of the rotor depicted in FIG. 2 and FIG. 3;

FIG. 9 is an example of a front view of still another modification of the rotor depicted in FIG. 2 and FIG. 3;

FIG. 10 is an example of a block diagram showing an example of a configuration of a power generating apparatus according to a second embodiment of the present invention;

FIG. 11 is an example of a block diagram showing an example of a configuration of a power generating apparatus according to a third embodiment of the present invention;

FIG. 12 to FIG. 14 are examples of an explanatory view of a manufacturing method of a flywheel according to a first embodiment of the present invention; and FIGS. 15 and 16 are examples of an explanatory view of a manufacturing method of a flywheel according to a second embodiment of the present invention.

DETAILED DESCRIPTION OF THE INVENTION

Embodiments will now be explained with reference to the accompanying drawings. Like components are provided with like reference signs throughout the drawings and repeated descriptions thereof are appropriately omitted. It is to be noted that the accompanying drawings illustrate the invention and assist the understanding of the illustration and that the shapes, dimensions, and ratios and so on in each of the drawings may be different in some parts from those in an actual apparatus.

Furthermore, a term representing a direction such as upper and lower sides in the description denotes a relative direction when a later-described rotor is arranged above a stator. Thus, it may be different from an actual direction based on a gravity acceleration direction.

(A) Flywheel and Power Generating Apparatus Including This (1) First Embodiment

FIG. 1 is a block diagram showing an example of a configuration of a power generating apparatus according to a first embodiment of the present invention. The power generating apparatus according to this embodiment includes a battery 10, a DC-AC converter 20, a motor 30, pulleys 40 to 43, belts 50 and 51, a rotary shaft 60, a flywheel 70, a power generator 90, a battery charger 95, a load ammeter 84, and a controller 100.

The battery 10 supplies electrical power to a load, the motor 30, and the flywheel 70 through the DC-AC converter 20. The battery 10 may be, e.g., a battery which can be charged with a direct current of 12 volts or a battery group constituted by connecting a plurality of such batteries in series or parallel. When the battery 10 is the battery group constituted by the plurality of batteries, the battery 10 can generate a direct-current voltage of 24 volts or 48 volts. For example, the battery 10 according to this embodiment is a battery group of 48 volts having four batteries of 12 volts connected in series.

The DC-AC converter 20 converts the direct-current power of the battery 10 into alternating-current power. For example, the DC-AC converter 20 converts direct-current (DC) power of 24 volts into alternating-current (AC) power of 100 volts or alternating-current (AC) power of 200 volts. The alternating-current power converted by the DC-AC converter 20 is supplied to the load, the motor 30, and the flywheel 70. In this embodiment, the load and the flywheel 70 are driven by the alternating-current power of AC 100 volts, and the motor 30 is driven by the alternating-current power of AC 200 volts.

The load could be an electrical device which consumes electrical power, and it is not limited thereto in particular. For example, the load may be a lighting equipment, an air-conditioning system, or the like which is used indoors or outdoors. Furthermore, the load could be lighting equipment, an air-conditioning system, or the like for a vehicle. In this embodiment, the load uses electrical power of AC 100 volts which is the same as commercial power, but it may use electrical power of AC 200 volts.

The motor 30 receives supply of the electrical power from the battery 10 through the DC-AC converter 20, and rotates a motor rotor 31. Maximum power consumption of the motor 30 is approximately 1000 watts based on standards. The motor rotor 31 is coupled with the pulley 40, and rotates the pulley 40. The belt 50 couples the pulleys 40 and 41 with each other to transmit rotary movement of the pulley 40 to the pulley 41. The pulley 41 is fixed to the rotary shaft 60, and the rotary shaft 60 rotates with the pulley 41. Thus, the motor 30 receives supply of the electrical power from the battery 10, and rotates the rotary shaft 60.

The rotary shaft 60 is shared by the pulley 41, the pulley 42, and the flywheel 70 as the rotation center thereof. A bearing of the rotary shaft 60 may be a rolling bearing, a slide bearing, or a magnetic bearing and is not limited thereto in particularly, but a bearing with a low rotational resistance is preferable. The bearing of the rotary shaft 60 may be, e.g., a floating bearing using a superconducting technology. Consequently, the rotational resistance of the rotary shaft 60 can be reduced as much as possible.

As will be described later with reference to FIG. 2 to FIG. 9, the flywheel 70 includes a rotor 72 which rotates together with the rotary shaft 60, and stores the kinetic energy by the rotary movement of the rotor 72.

The belt 51 couples the pulleys 42 and 43 with each other to transmit the rotary movement of the pulley 42 to the pulley 43. The pulley 43 is fixed to a shaft 91 of the power generator 90, and the rotary movement of the pulley 43 is transmitted to the shaft 91.

The power generator 90 generates power by using the rotation of the shaft 91, and stores the generated power in the battery 10 through the battery charger 95. That is, the power generator 90 converts the kinetic energy of the permanent magnet rotor into electrical energy, and stores this electrical energy in the battery 10. In this embodiment, the power generator 90 is a power generator which can generate, e.g., alternating-current power of AC 100 volts and can generate a current of up to 31 amperes based on standards.

The battery charger 95 charges the battery 10 with the electrical power generated by the power generator 90.

At this time, the battery charger 95 converts the generated electrical power of AC 100 V into direct-current power, and stores it in the battery 10. In this embodiment, the battery charger 95 consumes electrical power of, e.g., approximately 12 amperes with AC 100 volts.

The load may receive supply of the electrical power from the battery 10 and supply surplus power or regenerated power to the motor 30 or the battery charger 95 as indicated by arrows of a broken line. When the surplus power or the regenerated power is direct-current power, the load may directly return the surplus power or the regenerated power to the battery 10. When the load does not generate the surplus power or the regenerated power, the load just consumes the electrical power from the battery 10.

The load ammeter 84 is installed near the load, detects an amount of a current flowing through the load, and supplies a detection result to the controller 100.

As will be described later in detail, the controller 100 monitors at least one of an amount of the current in the load supplied from the load ammeter 84 and the number of revolutions of the rotor 72 included in the flywheel 70, and controls a control mechanism which controls the rotation of the rotor 72 by adjusting a gap between the stator 74 and the rotor 72.

FIG. 2 and FIG. 3 are examples of a plan view and a front view showing a structural example of the flywheel 70 according to the first embodiment, respectively. In this embodiment, the flywheel 70 includes a housing 210, a rotor 72, a stator 74, an encoder 82, a stepping motor 86, a ball screw 96, and a guide 98 as primary constituent elements.

The rotor 72 is fixed to the rotary shaft 60 so that it can rotate with the rotary shaft 60.

FIG. 4 is an example of a rear view of the rotor 72. As shown in FIG. 4, on a back surface of the rotor 72, i.e., an opposing surface TS72 facing the stator 74 (which will hereinafter be appropriately referred to as a "top surface TS72" or an "exposed surface TS72"), a plurality of permanent magnets 73 are arranged in rotation symmetry along a peripheral edge of this surface with an axis line of the rotary shaft 60 used as an axis of symmetry. In the example shown in FIG. 4, eight permanent magnets 73 are arranged in eight-fold rotational symmetry. In this embodiment, the opposing surface TS72 corresponds to, e.g., a first surface.

Returning to FIG. 3, the stator 74 is arranged to face the rotor 72 along an axial direction of the rotary shaft 60, disposed on an inner wall of the housing 210 through the guide 98 or the like, and thereby fixed in the housing 210 in a horizontal direction, i.e., a direction horizontal to the opposing surface facing the rotor 72.

On a top surface of the stator 74, i.e., an opposing surface TS74 facing the rotor 72 (which will hereinafter be appropriately referred to as a "top surface TS74" or an "exposed surface TS74"), a plurality of permanent magnets 75 are arranged in rotation symmetry along a peripheral edge thereof so as to correspond to the permanent magnets 73 on the rotor 72 side in a one-on-one relationship with the axis line of the rotary shaft 60 used as an axis of symmetry. In this embodiment, eight permanent magnets 75 are arranged. In this embodiment, the opposing surface TS74 corresponds to, e.g., a second surface.

At least a part of the surface of the stator 74 except the opposing surface TS74 facing the rotor 72 is covered with sheet-like carbon nanotubes (which will hereinafter be simply referred to as a "CNT sheet"). In the example shown in FIG. 3, a side surface and a bottom surface of the stator 74 are entirely covered with the CNT sheet. Consequently, magnetic force of the permanent magnets 75 is prevented from leaking to a region other than the gap between the stator 74 and the rotor 72.

Although not shown in FIG. 3 in particular, it is likewise desirable to cover the entire surface of the rotor 72 except the opposing surface TS72 facing the stator 74, with the CNT sheet to prevent the magnetic force from leaking.

Both the permanent magnets 73 and 75 have the same polarity, and have magnetism of the N pole in this embodiment. In this embodiment, the permanent magnets 73 and 75 correspond to, e.g., first permanent magnets and second permanent magnets, respectively.

FIG. 5 is an example of a partial cross-sectional view of the rotor 72 and the stator 74 taken along a cutting line DL in FIG. 2.

At least a part of a surface of the permanent magnet 73 provided in the rotor 72 except an opposing surface TS73 facing the stator 74 (which will hereinafter be appropriately referred to as a "top surface TS73" or an "exposed surface TS73") is covered with the CNT sheet. In the example shown in FIG. 5, all of the surface except the opposing surface TS73 (a side surface SS73 and a bottom surface BS73) is covered with the CNT sheet. In this embodiment, the surface TS73 corresponds to, e.g., a third surface.

Likewise, at least a part of a surface of the permanent magnet 75 provided in the stator 74 except an opposing surface TS75 facing the rotor 72 (which will hereinafter be appropriately referred to as a "top surface TS75" or an "exposed surface TS75") is covered with the CNT sheet. In an example shown in FIG. 6, all of the surface except the opposing surface TS73 (a side surface SS75 and a bottom surface BS75) is covered with the CNT sheet. In this embodiment, the surface TS75 corresponds to, e.g., a fourth surface.

As described above, when the surfaces of the pair of permanent magnets 73 and 75 facing each other except their opposing surfaces are at least partly covered with the CNT sheets, the magnetic lines of force can be intensively generated in the gap between these magnets.

Moreover, each permanent magnet 73 is arranged to incline to the top surface TS72 of the rotor 72 so that an acute angle is formed between its top surface TS73 and the top surface TS75 of the permanent magnet 75. Although an inclination angle θ is not limited thereto in particular, the inclination angle θ of approximately 5° is desirable in this embodiment.

In addition, a demagnetizing block 78 is arranged on each permanent magnet 75 on the stator 74 side so that it is extended from an end portion on a side having a wider gap between the permanent magnet 75 and the permanent magnet 73 to a part of the bottom surface BS75 through the side surface SS75. The demagnetizing block 78 is thus provided near the end portion on the side where the gap between the permanent magnet 75 and the permanent magnet 73 is wider, magnetism with a polarity opposite to that of the permanent magnet 75, i.e., an S pole can be prevented from being generated in a region between the permanent magnet 75 and an adjacent permanent magnet 75 on the stator 74. This is because a region outside the demagnetizing block 78 has an N pole when the inside of the demagnetizing block 78 has the S pole. Consequently, the magnetic lines of force extending from the top surface TS75 side of the permanent magnet 75 to the permanent magnet 73 arranged to face the counterpart can be intensified. In this embodiment, the demagnetizing block 78 corresponds to, e.g., a metal block.

Additionally, as shown in FIG. 5, a size of a portion of the demagnetizing block 78 on the bottom surface BS75 side of the permanent magnet 75 is desirably larger than a size of a portion on the top surface TS75. Consequently, as will be described later in detail, the magnetic lines of force extending toward the exposed surface (the opposing surface) TS73 of the permanent magnet 73 can be further intensified.

A material of the demagnetizing blocks 78 is not limited thereto in particular as long as it can block the magnetic lines of force from the permanent magnets 75, and a metal material containing an alloy, especially a ferrous material such as SS400 is desirable.

Again referring to FIG. 1, a direct current DC of, e.g., 48 V is supplied to the DC-AC converter 20, the DC-AC converter 20 converts this current into an alternating current AC of, e.g., 200 V, the converted current is supplied to the motor 30, the motor 30 is thereby activated, and the motor rotor 31 is rotated.

The rotation of the motor rotor 31 is transmitted to the pulley 41 through the pulley 40 and the belt 50, the rotary shaft 60 is thereby rotated, and the rotor 72 is also rotated. Once the rotor 72 starts the rotation by rotational force transmitted from the motor 30, then the rotor 72 rotates by attractive force and repulsive force caused due to the magnetic lines of force generated between the permanent magnets 73 and 75.

Functions of the attractive force and the repulsive force caused due to the magnetic lines of force between the permanent magnets 73 and 75 will now be described in more detail with reference to FIG. 6.

To explain how an influence of the magnetic lines of force from the permanent magnet 75 on the stator 74 side changes, FIG. 6 shows a single permanent magnet 73 at each of plurality of positions along a rotating direction AR1 of the rotor 72 like continuous shots.

First, when a tip of the permanent magnet 73 on the side where the gap to the stator 74 is narrower reaches a position A from an upstream side of the rotating direction AR1, the attractive force caused by the S pole in the demagnetizing block 78 is added to the rotational force of the rotor 72, whereby the permanent magnet 73 smoothly moves to a position C.

When the permanent magnet 73 reaches the position C, the magnetic lines of force from the exposed surface (the opposing surface TS75) of the permanent magnet 75 gives the repulsive force to the exposed surface (the opposing surface TS73) of the permanent magnet 73. Since the exposed surface TS73 of the permanent magnet 73 is inclined to the top surface TS72 of the rotor 72 at the inclination angle θ, the repulsive force from the permanent magnet 75 is added, and the rotational force in the rotating direction AR1 is increased.

Further, when the tip of the permanent magnet 73 reaches a position D, an area of the region in the opposing surface TS73 which receives the repulsive force from the permanent magnet 75 becomes large, and hence the rotational force in the rotating direction AR1 is further increased.

Incidentally, when the tip of the permanent magnet 73 reaches a position E, the area of the region which receives the repulsive force from the permanent magnet 75 becomes maximum, however an adjacent repulsive force caused due to the magnetic force in a space between this permanent magnet 75 and a non-illustrated permanent magnet 75 on the further downstream side is applied to the side surface SS73 of the permanent magnet 73 on the downstream side of the rotating direction. Thus, an increase in rotational force can be suppressed by the adjacent repulsive force.

Furthermore, in the demagnetizing block 78 provided on the end portion of the permanent magnet 75 on the upstream side of the rotating direction AR1 of the rotor 72, since a size of a portion of the permanent magnet 75 on the bottom surface BS75 side is larger than a size of a portion of the permanent magnet 75 on the top surface TS75 side, the magnetic lines of force from the permanent magnet 75 radiate around a position shifted toward the downstream side in the rotating direction of the rotor 72 as shown in FIG. 6. Consequently, the magnetic force against the exposed surface TS73 of the permanent magnet 73 is further intensified, and hence propulsive force in the rotating direction of the rotor 72 is further increased.

As described above, according to the flywheel 70 of this embodiment, since the side surface and the bottom surface of the stator 74 are covered with the CNT sheet and the surfaces of the respective permanent magnets 73 and 75 except their opposing surfaces TS73 and TS75 are covered with the CNT sheets, the magnetic lines of force can be effectively prevented from diffusing, and they can be concentrated in the space between the permanent magnets 73 and 75. Consequently, the propulsive force in the rotating direction AR1 of the rotor 72 can be increased. Additionally, electromagnets do not have to be provided on the stator 74, and hence the flywheel with low energy loss can be provided irrespective of its simple configuration. As a result, further miniaturization and generalization of the flywheel can be realized.

In the flywheel 70 according to this embodiment, since the energy loss is low, in a case where the rotor 72 continues high-speed rotation with no load or the like, accidents must be prevented from occurring depending on a usage environment. Thus, a control mechanism which controls rotating speed of the rotor 72 is provided in the power generating apparatus according to this embodiment.

The control mechanism includes an encoder 82, a stepping motor 86, ball screws 96, and guides 98 as shown in FIG. 2 and FIG. 3 in addition to the controller 100 and the load ammeter 84 shown in FIG. 1.

The encoder 82 is installed near the periphery of the rotor 72, detects the number of revolutions per unit time of the rotor 72, and supplies a detection result to the controller 100.

A threshold value for rotation control over the flywheel 70 is input to the controller 100 in advance or through a non-illustrated input apparatus. The controller 100 monitors at least one of the number of revolutions of the rotor 72 supplied from the encoder 82 and a load current supplied from the load ammeter 84, and generates an instruction signal and supplies it to the stepping motor 86 when the number of revolutions or the load power exceeds a predetermined threshold value. The instruction signal includes information of a rotating direction and a rotation amount of the stepping motor 86.

Upon receiving the instruction signal from the controller 100, the stepping motor 86 rotates in a designated rotating direction for a designated rotation amount in accordance with the instruction signal. Rotational force of the stepping motor 86 is transmitted to the ball screws 96 through a coupling 88, a timing belt 92, and a timing pulley 94, and bases of the ball screws 96 move along the guides 98, whereby the stator 74 moves in a direction indicated by an arrow AR2 in FIG. 3 along the axial direction of the rotary shaft 60. Consequently, the gap between the stator 74 and the rotor 72 is adjusted.

For example, when the power generator 90 is not used, even in a state where coupling with the power generator 90 is canceled and no load is used, minimum electrical power required for rotation of the rotor 72 must be supplied to the motor 30. In this case, the gap between the rotor 72 and the stator 74 is adjusted to become relatively wide so that the rotation of the rotor 72 can be maintained through reduction of influence of the magnetic force due to cogging or the like.

When an overload occurs in a situation in which coupling with the power generator 90 is achieved and the power generator 90 is used, to reduce a burden on the motor 30, the gap between the rotor 72 and the stator 74 is changed in accordance with an amount of a current from the load ammeter 84, and an increase or decrease in repulsive force caused due to the magnetic force is synchronized with a motion of the load.

Further, to supply the stable electrical power, the number of revolutions of the flywheel 70 must be stabilized. Thus, the controller 100 monitors the number of revolutions of the rotor 72 with the use of the encoder 82, and changes the gap between the rotor 72 and the stator 74 in tandem with occurrence of a fluctuation in number of revolutions, e.g., excessive rotation or insufficient rotation so that the appropriate number of revolutions can be provided.

Furthermore, when the power generating apparatus itself is stopped, the control mechanism moves the rotor 72 and the stator 74 away from each other to provide a length therebetween sufficient to suppress an interrelated influence of the magnetic force between the permanent magnets 73 and 75.

Here, the rotating speed of the flywheel 70 can be also adjusted by changing a shape of the rotor 72. The rotation can be further facilitated by increasing an inertia mass which can be realized by reducing a mass near the center to lower the entire mass or making a peripheral edge portion thicker than a central portion, instead of making the rotor 72 having a disk shape with a uniform thickness.

FIG. 7 to FIG. 9 show several modifications of the rotor 72. According to a rotor 72A shown in a plan view of FIG. 7, openings OP are provided between permanent magnets 73 and a central axis to reduce a mass of a central portion. Moreover, a rotor 72B shown in a front view of FIG. 8 is formed so that its thickness is gradually decreased from a peripheral edge toward a center like a concave lens. Additionally, like a rotor 72C shown in a front view of FIG. 9, the rotor may be formed so that a peripheral edge portion alone has a large thickness.

It is to be noted that the example where the eight permanent magnets 73 are arranged in eight-fold rotational symmetry has been described to simplify the explanation in this embodiment but, as a matter of course, the number of the magnets is not limited to eight, and it may be four, or a figure exceeding eight, e.g., 12, 24, or 36. In the present circumstances, it is proved that, when 24 permanent magnets are arranged in each of the rotor 72 and the stator 74, the best efficiency can be provided in conversion from the electrical energy to the kinetic energy. This point is also true in the following second embodiment and third embodiment.

(2) Second Embodiment

FIG. 10 is a block diagram showing an example of a configuration of a power generating apparatus according to a second embodiment of the present invention. The second embodiment is different from the first embodiment in that a transformer 110 connected between a power generator 90 and a battery charger 95 is provided. Other constituent elements in the second embodiment are substantially the same as corresponding constituent elements in the first embodiment.

The transformer 110 can transform alternating-current power of AC 100 volts into AC 200 volts, and supply this alternating-current power to a motor 30. In this case, the transformer 110 can supplement a part of power consumption by the motor 30. Consequently, an electrical burden on a DC-AC converter 20 can be reduced.

Further, when a battery charger 95 and/or a load does not comply with a voltage from the power generator 90, the transformer 110 may transform the electrical power from the power generator 90 to a voltage adapted to the battery charger 95 and/or the load and supply the transformed electrical power to the battery charger 95 and/or the load. In this case, the transformer 110 may supply all of power consumption by the power charger 95 and/or the load. Consequently, as the DC-AC converter 20 has only to drive the motor 30, and hence the electrical burden on the DC-AC converter 20 can be further reduced.

When the transformer 110 supplies the electrical power, the alternating-current power generated from the power generator 90 can be used as it is. In this case, since there is no need to convert the direct-current power from the battery 10 into the alternating-current power, efficiency is better than that in the case of supplying the electrical power from the battery 10.

As described above, according to the second embodiment, providing the transformer 110 enables further efficient usage of the electrical power generated by the power generator 90. Furthermore, the second embodiment includes an improved flywheel 70 like the first embodiment. Thus, the second embodiment can provide the same effects as those of the first embodiment.

(3) Third Embodiment

FIG. 11 is a block diagram showing an example of a configuration of a power generating apparatus according to a third embodiment of the present invention. The third embodiment is different from the first embodiment in that a dynamo which generates direct-current power is provided as a power generator 93. In the third embodiment, since the dynamo is used as the power generator 93, the alternating-current power generator 90 and the battery charger 95 in the first embodiment are no longer necessary. Other constituent elements in the third embodiment are substantially the same as corresponding constituent elements in the first embodiment except for no connection between the load and the power generator 93.

The power generator 93 generates direct-current power by rotation of a shaft 91, and stores the generated power in a battery 10. That is, the power generator 93 converts kinetic energy of a rotor 72 into electrical energy, and stores this electrical energy in the battery 10. In the third embodiment, the power generator 93 is a power generator which can generate, e.g., direct-current power of DC 24 volts, and can generate a current of up to 50 amperes based on standards. It is to be noted that, in the third embodiment, the battery 10 is a battery group of 24 volts in which two batteries of 12 volts are connected in series.

Like the third embodiment, the power generating apparatus according to the present invention can be realized by using not only the power generator 90 of the alternating-current power shown in FIG. 1 and FIG. 2 but also by the power generator (the dynamo) 93 of the direct-current power. The third embodiment includes an improved flywheel 70 which has a simple configuration and low energy loss, and hence it can highly efficiently convert the electrical energy into the kinetic energy like the first embodiment.

The power generating apparatus according to the foregoing embodiment can be driven by the battery 10 alone. Thus, the power generating apparatus according to this embodiment has a high utility value particularly outdoors where there is no commercial power. Furthermore, since it does not use fossil fuels such as petroleum or gasoline, it has an advantage of environment friendliness.

Since the flywheel 70 according to the foregoing embodiment is driven by the battery 10 alone and does not require an external power supply, it can be applied to, e.g., an automobile, and can generate power even in a place where supply of electrical power is difficult, e.g., a small boat or in outdoor leisure. Moreover, it can stably generate electrical power for 24 hours 365 days without being dependent on natural environments or weather, and it can perform private power generation even if community infrastructures or social infrastructures are interrupted at the time of disaster. Since fuels are not used to generate the power, there is no danger of occurrence of accidents such as ignition or explosion. Furthermore, for example, when a water cell is used as the battery 10, power generation costs can be greatly reduced.

It is to be noted that the power generating apparatus and the flywheel according to the foregoing embodiment can be combined with a superconducting flywheel. However, the superconducting flywheel actually requires liquid nitrogen, liquid helium, or the like for cooling, which leads to an increase in costs. Normal temperature superconductivity is in a development phase of material at this time. Thus, it can be said that the flywheel 70 according to the foregoing embodiment is realistic and suitable for mass production at low costs.

In the first to third embodiments, to simplify the explanation, the example where the eight permanent magnets 73 are arranged in eight-fold rotational symmetry has been described but, as a matter of course, the number of the magnets is not limited to eight, and it may be four, or a figure exceeding eight, e.g., 12, 24, or 36. In the present circumstances, it is proved that, when 24 permanent magnets are arranged in each of the rotor 72 and the stator 74, the best efficiency can be provided in conversion from the electrical energy to the kinetic energy.

Moreover, in the first to third embodiments, as indicated by reference sign AR1 in FIG. 2, FIG. 3, and FIG. 6, the side where the gap between the permanent magnets 73 and 75 is wide is determined as the upstream side of the rotating direction, the side where the gap between the permanent magnets 73 and 75 is narrow is determined as the downstream side of the rotating direction, and how the rotor 72 rotates has been described. However, the rotating direction of the rotor 72 is not limited thereto, and the rotor 72 may be rotated in an opposite direction of reference sign AR1 in FIG. 2, FIG. 3, and FIG. 6 when increasing a rotation torque in accordance with magnitude of the load is desired. In this case, the motor 30 could be controlled in such a manner that the rotating direction of the motor 30 is reversed.

(B) Manufacturing Method of Flywheel

Several embodiments of a manufacturing method of the flywheel 70 included in the power generating apparatus according to the foregoing embodiments will now be briefly described with reference to FIG. 12 to FIG. 16.

(1) First Embodiment

First, the permanent magnets 73 and 75 are prepared. It is desirable to cover surfaces of the permanent magnets 73 and 75 except opposing surfaces of these magnets with the CNT seal in accordance with, e.g., the following process. In applying the CNT seal, a water-based epoxy resin is used.

For example, as shown in FIG. 12, the permanent magnet 73 is turned upside down and arranged and fixed on a base 120 in such a manner that the top surface TS73 (refer to FIG. 5) is in contact with the base 120, and the CNT mixed (dissolved) in the water-based epoxy resin is applied, dropped, or sprayed to the bottom surface BS73 (refer to FIG. 5) of the permanent magnet 73 with the use of a printing technique. The printing technique may be a well-known printing technique such as a laser method or an inkjet method. At this time, since the CNT has an ink-like form, it is discharged from a nozzle 152 toward the permanent magnet 73.

Then, the CNT dissolved in the water-based epoxy resin is heated. Consequently, moisture is evaporated from the water-based epoxy resin, and the CNT is thermocompression-bonded to the permanent magnet 73 through the epoxy resin. Thus, the CNT adheres (adsorbs) to the bottom surface BS73 of the permanent magnet 73.

Then, the base 120 is inclined to change a position of the permanent magnet 73 in such a manner that its side surface, e.g., the side surface SS73A turns up (not shown). Like the bottom surface BS73, the CNT mixed (dissolved) in the water-based epoxy resin is discharged from the nozzle 152 to be applied, dropped, or sprayed to the side surface SS73A of the permanent magnet 73 with the use of the printing technique.

Subsequently, the CNT dissolved in the water-based epoxy resin is heated. Consequently, moisture is evaporated from the water-based epoxy resin, and the CNT is thermocompression-bonded to the permanent magnet 73 through the epoxy resin. Thus, the CNT adheres (adsorbs) to the bottom surface BS73 of the permanent magnet 73.

Thereafter, the same process (application, drop, or spraying of the CNT dissolved in the water-based epoxy resin and then thermocompression-bonding) is repeated to other side surfaces SS73B to SS73D. Consequently, the surface of the permanent magnet 73 except the top surface TS73 is covered with the CNT sheet.

The bottom surface BT75 and the side surface of the permanent magnet 75 except the top surface TS75 are likewise covered with the CNT sheet by the same process.

Specifically, for example, as shown in FIG. 12, the permanent magnet 75 is turned upside down and arranged and fixed on the base 120 in such a manner that the top surface TS75 (refer to FIG. 5) is in contact with the base 120, and the CNT mixed (dissolved) in the water-based epoxy resin is applied, dropped, or sprayed to the bottom surface BS75 (refer to FIG. 5) of the permanent magnet 75 with the use of a printing technique. The printing technique may be a well-known printing technique such as a laser method or an inkjet method. At this time, since the CNT has an ink-like form, it is discharged from a nozzle 152 toward the permanent magnet 75.

Then, the CNT dissolved in the water-based epoxy resin is heated. Consequently, moisture is evaporated from the water-based epoxy resin, and the CNT is thermocompression-bonded to the permanent magnet 75 through the epoxy resin. Thus, the CNT adheres (adsorbs) to the bottom surface BS75 of the permanent magnet 75.

Then, the base 120 is inclined to change a position of the permanent magnet 75 in such a manner that its side surface, e.g., the side surface SS75A turns up (not shown). Like the top surface TS75, the CNT mixed (dissolved) in the water-based epoxy resin is discharged from the nozzle 152 to be applied, dropped, or sprayed to the side surface SS75A of the permanent magnet 75 with the use of the printing technique. Further, the CNT dissolved in the water-based epoxy resin is heated to evaporate moisture from the water-based epoxy resin, and the CNT is thermocompression-bonded (adsorbs) to the permanent magnet 75 through the epoxy resin.

Thereafter, the same process is performed to other three side surfaces SS75B to 75D to allow the CNT to be thermocompression-bonded (adsorb) to the permanent magnet 75 by using the epoxy resin.

Then, as shown in FIG. 13, a rotor plate 72B in which concave portions 172 are previously arranged in accordance with shapes of the permanent magnets 73 is prepared. In this embodiment, a bottom surface of each concave portion 172 is inclined in advance so that a depth changes along a rotating direction of the rotor 72.

Subsequently, after applying, e.g., an adhesive (not shown) to the concave portions 172, positioning is performed in such a manner that the top surfaces TS73 of the permanent magnets 73 turn up, and the permanent magnets 73 are fitted into the concave portions 172 respectively and fixed by solidifying the adhesive with the use of a well-known method.

As to each permanent magnet 75, for example, as shown in FIG. 5, a well-known method is used to arrange the demagnetizing block 78 extending from the end portion of the top surface TS75 on the upstream side in the rotating direction AR1 of the rotor 72 to a part of the bottom surface BS75 through the side surface SS75.

Thereafter, as shown in FIG. 14, a stator plate 74B in which concave portions 174 are previously arranged in correspondence with shapes of the permanent magnets 75 is prepared, an adhesive (not shown) or the like is applied to the concave portions 172, then positioning is performed in such a manner that the top surfaces TS75 of the permanent magnets 75 turn up, and the permanent magnets 75 are fitted into the concave portions 174 respectively and fixed by solidifying the adhesive with the use of a well-known method.

Subsequently, the guides 98 are disposed to the housing 210 (see FIG. 2 and FIG. 3) by using a well-known assembling method, the mechanism for gap adjustment including the stepping motor 86, the coupling 88, the timing belt 92, the timing pulley 94, and the ball screws 96 is assembled, then the stator 74 is disposed, and the rotor 72 and the rotary shaft 60 are positioned and rotatably disposed onto the stator 74, thereby providing the flywheel 70.

(2) Second Embodiment

According to the above-described manufacturing method, the permanent magnets 73 and 75 are positioned in the concave portions 172 and 174 of the respective plates and then fixed. However, the repulsive forces of adjacent magnets act to each other with intensity corresponding to the size of the plates and the number of magnets, and thus an accuracy of the positioning may be deteriorated in some situations. In such a case, magnetizable metal chips having the same shape may be used from the beginning in place of the permanent magnets 73 and 75, covered with CNT sheets, fitted and fixed in concave portions 172 of a rotor plate 72B shown in FIG. 13 for a rotor 72 or fitted and fixed in concave portions 174 in a stator plate 74B shown in FIG. 14 for a stator 74, and then collectively magnetized in accordance with each of the rotor plate 72B and the stator plate 74B.

As a magnetizing method for the rotor 72, for example, as shown in FIG. 15, the magnetizable metal chips 173 are fitted and fixed in the concave portions 172 of the rotor plate 72B shown in FIG. 11, the entire rotor plate 72B is disposed to a magnetizing apparatus 300 in this state, and collective magnetization is performed.

Likewise, as a magnetizing method for the stator 74, for example, as shown in FIG. 16, the magnetizable metal chips 175 are fitted and fixed in the concave portions 174 of the stator plate 74B shown in FIG. 12, the entire stator plate 74B is disposed to the magnetizing apparatus 300 in this state, and collective magnetization is performed. In this embodiment, the magnetizable metal chips 173 and 175 correspond to, e.g., first and second magnetizable metal chips, respectively, and the concave portions 172 and 174 correspond to, e.g., first and second concave portions, respectively.

According to this embodiment, since the permanent magnets 73 and 75 can be accurately arranged at desired positions on the rotor plate 72B and the stator plate 74B respectively, the flywheel can be highly accurately manufactured.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions.

For example, in the foregoing embodiments, although the description has been given as to the example where the CNT coat is applied to the permanent magnets and the permanent magnets on the rotor side are arranged at a slant, the present invention is not limited thereto, and the rotation of the rotor can be maintained by the attractive force and the repulsive force of the magnetic lines of force between the rotor side and the stator side as long as the permanent magnets simply having the same polarity are arranged on the rotor side and the stator side to face each other. It is to be noted that, when the permanent magnets on the rotor side are not arranged at a slant, the demagnetizing blocks are not required.

Furthermore, although the permanent magnet or the magnetizable metal chip having a rectangular parallelepiped shape is taken as the example, but the shape of the permanent magnet or the magnetizable metal chip is not limited thereto, it is possible to use a permanent chip or a magnetizable metal having a cubic shape or a shape with a circular or elliptic planar shape.

Moreover, although in the above mentioned embodiment the power generating apparatus is taken as the example in which the motor 30 rotates the rotary shaft 60 of the flywheel via the pulley and belts, however, the present invention is never limited thereto. For example, the rotary shaft (not shown) of the motor may be aggregated with the rotary shaft 60 of the flywheel, thereby enabling the motor 30 to rotate the rotor 60 via such a single rotary shaft without any pulley, belt and so on.

The accompanying claims and their equivalents are intended to cover such forms or modifications as would fall within the scope and spirit of the inventions.

The invention claimed is:

1. A flywheel comprising:
a rotary shaft which is rotatably provided;
a rotor which is fixed to the rotary shaft and rotatable with the rotary shaft; and
an unrotatable stator which is arranged so as to face the rotor,
wherein the rotor comprises first permanent magnets provided on a first surface facing the stator, and
the stator comprises second permanent magnets which are provided on a second surface facing the rotor in correspondence with the first permanent magnets respectively and have the same polarity as that of the first permanent magnets,
wherein each of the second permanent magnets further comprises a metal block provided to extend from a part of a surface facing the rotor to a part of a bottom surface through a side surface.

2. The flywheel according to claim 1,
wherein at least a part of a surface of each of the first permanent magnets except a third surface facing the stator is covered with carbon nanotubes, and
at least a part of a surface of each of the second permanent magnets except a fourth surface facing the rotor is covered with the carbon nanotubes.

3. The flywheel according to claim 1,
wherein the first permanent magnets are provided at a slant in the rotor in such a manner that each third surface facing the stator forms an acute angle between itself and the second surface.

4. The flywheel according to claim 1,
wherein at least a part of a surface of the stator except the second surface is covered with the carbon nanotubes.

5. The flywheel according to claim 1,
wherein at least one of the rotor and the stator has a larger thickness on a peripheral edge side than on the rotary shaft side.

6. The flywheel according to claim 1,
wherein at least one of the rotor and the stator is provided with an opening between the first permanent magnets and the rotary shaft and/or the second permanent magnets and the rotary shaft.

7. A power generating apparatus comprising:
a rechargeable battery configured to supply electrical power;
a flywheel comprising a rotatable rotary shaft, a rotor rotatably fixed to the rotary shaft and an unrotatable stator arranged so as to face the rotor;
a motor configured to receive the electrical power from the battery and rotates the rotary shaft; and
a power generator configured to convert kinetic energy of the rotor into electrical energy and charges the battery,
wherein the rotor comprises first permanent magnets arranged on a first surface facing the stator, and
the stator comprises second permanent magnets which are arranged on a second surface facing the rotor in correspondence with the first permanent magnets respectively and have the same polarity as that of the first permanent magnets, and a control mechanism configured to adjust a gap between the rotor and the stator by moving the stator in an axial direction of the rotary shaft, wherein the control mechanism comprises an encoder which detects the number of revolutions of the rotary shaft, and a controller which operates the control mechanism on the basis of a detection result of the encoder, wherein the control mechanism comprises a current sensor configured to detect an amount of a current flowing through a load connected to the power generating apparatus, and the controller calculates electrical power of the load from a detection result of the current sensor, and operates the control mechanism on the basis of at least one of the number of revolutions of the rotary shaft and the electrical power of the load.

8. The power generating apparatus according to claim 7, wherein at least a part of a surface of each of the first permanent magnets except a third surface facing the stator is covered with carbon nanotubes, and at least a part of a surface of each of the second permanent magnets except a fourth surface facing the rotor is covered with the carbon nanotubes.

9. The power generating apparatus according to claim 7, wherein the first permanent magnets are provided at a slant in the rotor in such a manner that each third surface facing the stator forms an acute angle between itself and the second surface.

10. A power generating apparatus comprising:

a rechargeable battery configured to supply electrical power;

a flywheel comprising a rotatable rotary shaft, a rotor rotatably fixed to the rotary shaft and an unrotatable stator arranged so as to face the rotor;

a motor configured to receive the electrical power from the battery and rotates the rotary shaft; and a power generator configured to convert kinetic energy of the rotor into electrical energy and charges the battery, wherein the rotor comprises first permanent magnets arranged on a first surface facing the stator, and the stator comprises second permanent magnets which are arranged on a second surface facing the rotor in correspondence with the first permanent magnets respectively and have the same polarity as that of the first permanent magnets, wherein each of the second permanent magnets further comprises a metal block provided to extend from a part of a surface facing the rotor to a part of a bottom surface through a side surface.

11. The power generating apparatus according to claim 7, wherein at least a part of a surface of the stator except the second surface is covered with the carbon nanotubes.

12. The power generating apparatus according to claim 7, wherein at least one of the rotor and the stator has a larger thickness on a peripheral edge side than on the rotary shaft side.

13. The power generating apparatus according to claim 7, wherein at least one of the rotor and the stator is provided with an opening between the first permanent magnets and the rotary shaft and/or the second permanent magnets and the rotary shaft.

* * * * *